G. WEBER.
CUTTER FOR WOOD SCREW CUTTING MACHINES.
APPLICATION FILED SEPT. 24, 1904.

956,748.

Patented May 3, 1910.

Witnesses:
L. H. Staaden.
M. M. Hovey.

Inventor:
Gustav Weber
by Alfred Keller
Atty

UNITED STATES PATENT OFFICE.

GUSTAV WEBER, OF HAGEN, WESTPHALIA, GERMANY.

CUTTER FOR WOOD-SCREW-CUTTING MACHINES.

956,748.  Specification of Letters Patent.  Patented May 3, 1910.

Application filed September 24, 1904. Serial No. 255,728.

*To all whom it may concern:*

Figure 1:
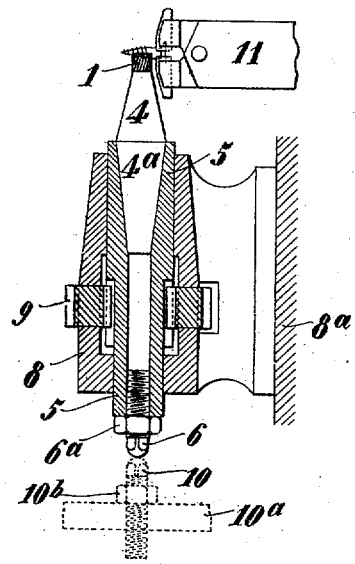
Figure 2:
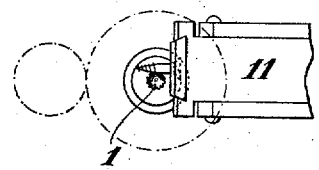

Be it known that I, GUSTAV WEBER, a citizen of the German Empire, residing at Hagen, in the Province of Westphalia and Kingdom of Prussia, Germany, have invented certain new and useful Improvements in Cutters for Wood - Screw - Cutting Machines, of which the following is a specification.
This invention relates to improvements in that sort of cutters for wood screw cutting machines where the cutter proper resembles a little toothed wheel or a part of a sharp threaded screw spindle instead of the comb cutters formerly used. The working of these new cutters, as is known is thus, that the cutterwheel rolls along the quickly rotating bolt or blank, which is to be provided with screw thread and its advance is so, that at each revolution of the bolt, it moves forward by the pitch of the screw thread or by the distance from thread to thread. Now these cutterdisks have the disadvantage that they are only fit for making large or comparatively long screws, for making thin and short screws, say of 3/32 or 1/8 inch diameter and 1/4 of an inch length only, they are unfit, because on account of the size of their diameter they can not be brought so close to the bolt, but would come in contact with the device (clamping tongs) holding the bolt or blank. That sort of cutters of this class, which consist of a sufficiently long piece of mutiple sharp threaded screw with a sharp edge and concave cutter end can not be made so thin, say 1/8 of an inch only, because they would either bend or break. This is proved by experience; they break when they are sufficiently hard, because in this case they can not resist the bending strain, to which they are exposed and when they are not hard they bend and then the screws cut by them are not uniform. Now my present invention avoids all these drawbacks and I attain the object in view by constructing the cutting tool and the holder for the same as described hereafter and shown on the accompanying drawing, in which—
Figure 1 shows the construction of the new cutter and the manner and means of fixing the same in a tool holder ready for cutting a screw, Fig. 2 is a top view of Fig. 1.

By 1 is indicated the cutter head which is provided on its circumference with the threads of the form of a multiple screw; its upper end is turned out concave, so as to form on its edge cutter teeth, which correspond in shape and pitch with the screw thread to be cut. From the lower side of the head 1 extends a slightly conical shaft 4, 4ª, by which the cutter is connected to and held in the hollow spindle 5 of the tool holder 8, which itself is fixed to, or forms part of the machine frame indicated by the shaded lines 8ª. The machine itself having nothing to do with the present invention, other parts than those absolutely necessary are not shown on the drawing. The spindle 5 is held rotatively and movably in axial direction in the holder 8, it is set in rotation by a spur wheel 9, which meshes with a pinion, not shown in Fig. 1, but indicated in dotted lines in Fig. 2. The wheel 9 is so held in the holder 8 that it cannot be shifted in an axial direction on the spindle but that the latter can be moved up and down and adjusted therein by the combined action of the screw 6 and the set screw 10 the latter being indicated in dotted lines and resting on a bracket 10ª fixed to or forming part of the main frame of the machine, the heads of both screws 6 and 10 bear against each other and by their set nuts 6ª and 10ᵇ, respectively, they can be finely adjusted.

By 11 is indicated the clamp which holds the blank to be provided with screw thread, this clamp is held rotatively in the machine. It also does not form part of the present invention and therefore only so much of it is shown as is necessary for the understanding of the invention. From the description given so far, it will now be easily understood that by means of the new cutter in combination with the tool holder very small screws can be cut and the thread can be cut quite close to the head of the blank. The slightly conical lower part of the cutter shaft allows fixing and adjusting of the latter in the spindle 5 without any special means; it requires only a slight blow or a little tipping to fasten it in the spindle 5 and the pressure exerted upon it while at work secures it in its place, while on the other hand this mode of fixing it, allows its ready and nice adjustment with regard to the screw to be cut.

What I claim as my invention and desire to secure by Letters Patent is:

In a wood screw cutting machine for making very small screws the combination with a frame, of a holder fixed to said frame, a clamp for holding the screw blank, an adjustable hollow spindle rotatably held in said holder, means for rotating said spindle, and a cutter, comprising a head provided with cutting threads on its circumference and having at its front end a cavity, the said head being formed on a double conical shaft, firmly held in said hollow spindle and adapted to rotate therewith.

In testimony whereof I have hereunto affixed my signature in presence of two witnesses.

GUSTAV WEBER.

Witnesses:
J. A. RITTERSHAUS,
HEINR. AHLEFELDER.